United States Patent [19]

Michael Peter Colin

[11] 3,851,260

[45] Nov. 26, 1974

[54] SIGNAL SAMPLING CIRCUITS

[75] Inventor: Michael Peter Colin, Newbury, England

[73] Assignee: Micro Consultants Limited, Newbury, England

[22] Filed: Aug. 7, 1973

[21] Appl. No.: 386,342

[30] Foreign Application Priority Data

Aug. 10, 1972 Great Britain .................... 37391/72

[52] U.S. Cl.............. 328/151, 307/227, 307/235 R, 328/165, 328/186

[51] Int. Cl....... H03k 5/20, H03k 17/16, H03k 4/02

[58] Field of Search............ 307/227, 235 A, 235 R, 307/246; 328/146, 147, 151, 162, 163, 165, 186

[56] References Cited

UNITED STATES PATENTS

| | | | |
|---|---|---|---|
| 3,278,851 | 10/1966 | Damon, Jr. et al. | 328/147 X |
| 3,289,089 | 11/1966 | Linder | 328/165 X |
| 3,480,795 | 11/1969 | Benson et al. | 328/151 X |
| 3,528,007 | 9/1970 | Stinson, Jr. | 328/151 X |
| 3,586,880 | 6/1971 | Fitzwater, Jr. | 328/165 X |
| 3,605,012 | 9/1971 | Kubanoff | 328/165 X |
| 3,646,364 | 2/1972 | Kaminski | 328/165 X |
| 3,659,117 | 4/1972 | Caveney et al. | 328/151 X |
| 3,710,141 | 1/1973 | Zeiger | 328/151 X |
| 3,721,912 | 3/1973 | Ross | 328/151 |

*Primary Examiner*—Rudolph V. Rolinec
*Assistant Examiner*—L. N. Anagnos
*Attorney, Agent, or Firm*—William Anthony Drucker

[57] ABSTRACT

A signal sampling circuit comprising a differential buffer amplifier, a first line for receiving an analogue signal from a first output of said amplifier, a second line for receiving an inverted replica of the analogue signal from a second output of the amplifier, switch means in each line for simultaneous sampling of the analogue signal and the inverted replica signal, storage means in said first and second lines, means for triggering said switch means to permit passage of the analogue and the inverted replica signals during the sampling period to charge said storage means, and a further differential buffer amplifier for receiving stored signals and for producing at its output substantially interference-free signals.

10 Claims, 5 Drawing Figures

SIGNAL SAMPLING CIRCUITS

BACKGROUND TO THE INVENTION

This invention relates to a circuit for effecting signal sampling and more particularly but not solely to a circuit in which an analogue signal is sampled which reduces the effect of unwanted induced interfering signals.

A circuit is known in which an analogue signal is connected with a storage capacitor via a bridge circuit formed by four diodes one in each branch of the bridge. The signal is connected to one nodal point of the bridge and is available as an output from the opposite nodal point of the bridge when a triggering signal, which forward biases all of the diodes, is applied between the other pair of oppositely disposed nodal points. One of the main disadvantages of this sampling circuit is that disturbances present at the diode after the sampling pulse has been removed cause excursions of the analogue output for a period of time which is dependent upon circuit stray components. The excursions are unwanted and limit the speed at which samples may be taken. The principal cause of these excursions is stray inductance and stray capacitance which may be reduced but which may not be eliminated.

This invention improves the sampling performance by reducing the effect of stray inductance and capacitance.

SUMMARY OF INVENTION

According to the invention, we provide a signal sampling circuit comprising

*a.* a first line for receiving an analogue signal,

*b.* a second line for receiving an inverted replica of the analogue signal,

*c.* switch means in each line for simultaneous sampling of the analogue signal and the inverted replica signal,

*d.* storage means in said first and second lines, and

*e.* means for triggering said switch means to permit passage of the analogue and the inverted replica signals during the sampling period to charge said storage means, whereby on receipt of stored signals by a differential buffer amplifier substantially interference-free signals are produced.

The combination of the two stored signals may effect cancellation of interfering in phase components.

A differential amplifier may be provided having its outputs connected to respective ones of said first and second lines to provide on the second line an inverted replica of the signal on the first line which signals are derived from an analogue input signal connected to an input of the differential amplifier.

The switch means in each line may comprise a diode bridge circuit connected in the line by opposite nodal pairs and the bridge circuit may be switched by the triggering signals applied between the other opposite nodal pairs of the bridge circuit.

The triggering signals for each bridge circuit may be derived from a respective transformer secondary winding which transformer has its primary winding connected with a triggering signal source.

The means for combining the stored signals may comprise a differential amplifier which may be advantageously constructed from field effect transistors.

BRIEF DESCRIPTION OF DRAWINGS

The invention will now be described by way of example with reference to the accompanying drawings, wherein.

DESCRIPTION OF PREFERRED EMBODIMENT

In the circuit diagrams for simplicity, the same reference figures have been used for like circuit components.

Figure 1:
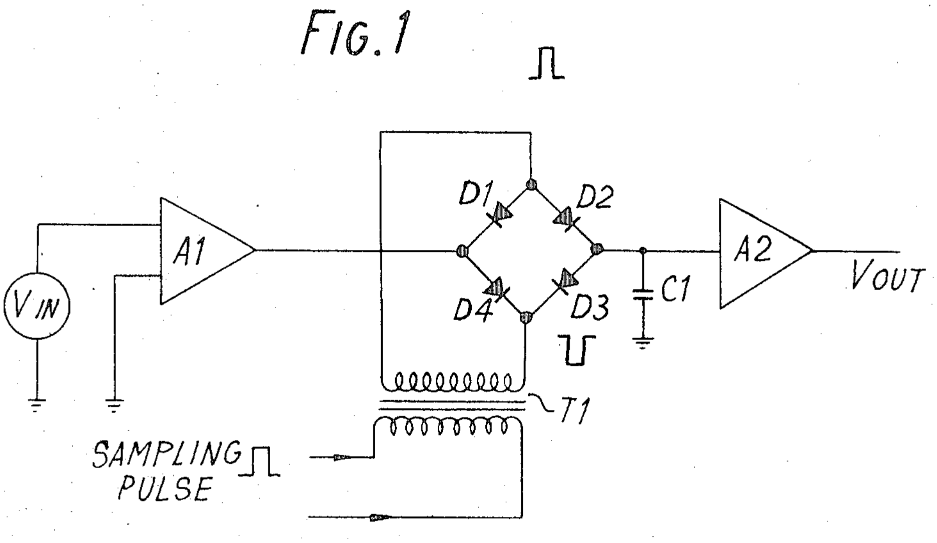
FIG. 1 shows a sample hold circuit of a type known to us.

The sample and hold circuit shown in FIG. 1 is typical of many circuits known to us. An input amplifier A1 accepts an analogue input signal voltage V in and buffers it to produce an output of the same voltage at a lower impedance. The output from amplifier A1 is applied to a sampling bridge comprising diodes D1. D2, D3 and D4. The output from the sampling bridge is applied to a memory capacitor C1 which stores the voltage between each sampling period. The voltage on capacitor C1 is buffered by the output buffer amplifier A2 and appears as a lower impedance output Vout.

Figure 2:
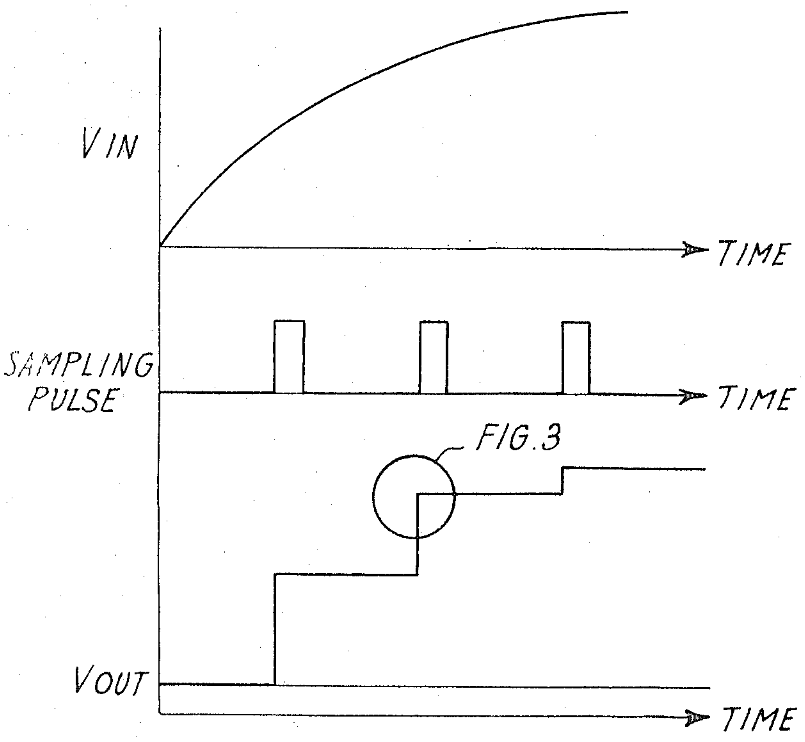
FIG. 2 shows a graph of input voltage and output voltage of the sample hold circuit of FIG. 1 plotted on a time axis.
Figure 3:
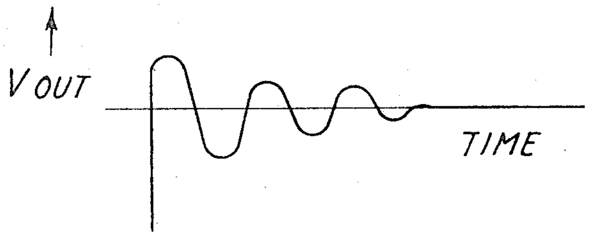
FIG. 3 shows an enlarged scale of the interference at the transition of the storage charge to a new level due to the transformer.

The mechanism of operation is as follows: A sampling pulse is applied to the primary of transformer T1 and appears at the secondary of the same transformer to pass a current through the diode D1, D2, D3 and D4. These diodes are matched so that at a given current through the diode bridge the same voltage appears at the output as is present at the input. That voltage then is impressed on memory capacitor C1 and appears as an output from output buffer amplifier A2. At the end of the sampling pulse the current flowing through the diode bridge returns to zero and the capacitor is disconnected from the analogue input and thus remains in its charged or storage condition. The current flowing out of the memory capacitor C1 is sufficiently low that it retains substantially all its stored charge in between each sampling pulse. At the next sampling period a sampling pulse is again applied to the transformer T1 and the diode bridge is again made to conduct thus allowing capacitor C1 to be charged to the input present at that moment in time. One of the main disadvantages of this sampling circuit is that disturbances present at the diode after the sampling pulse has been removed cause excursions of the analogue output for a period of time which is dependent upon circuit stray components. The excursions are unwanted and limit the speed at which samples may be taken. The principal cause of these excursions is stray inductance and stray capacitance which may be reduced but which may not be eliminated. The graph of FIG. 2 shows input and output voltage and the excursions are shown on an enlarged scale in FIG. 3.

Figure 4:
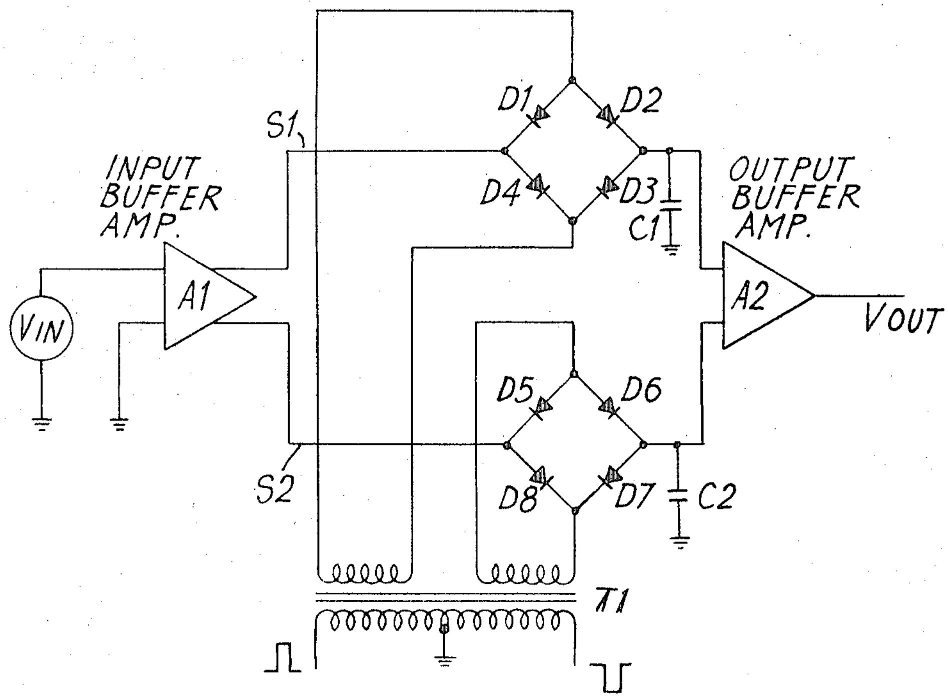
FIG. 4 shows a sample hold circuit with a differential sampling system according to the present invention.

The present invention improves the performance of high speed sample and hold circuits by using a fully differential sampling system similar to that shown in FIG. 4. The principle of the operation is that the analogue input is first of all split into differential signals by an input buffer amplifier A1 connected to respective signal lines S1, S2 connected to respective outputs of the differential amplifier A1. Therefore, on one line an inverted replica of the signal on the other line is provided. Each signal is then applied to a respective one of two identical hot carrier sampling bridges formed from diodes D1, D2, D3, D4 and D5, D6, D7, D8 driven from the same transformer T1. The output of each sampling bridge is applied to its own memory capacitor C1 or C2 and from thence into a differential output amplifier A2. In principle the circuit operation is identical to that in FIG. 1. however any common mode signals introduced at the output of capacitors C1 and C2 by stray inductance and stray capacitance are eliminated or substantially reduced by the differential amplifier A2 which amplifies the difference between the stored signals. The oscillations and excursions, which occur after each sampling pulse, are similar and in phase on capacitors C1 and C2 and are thus eliminated by the differential output amplifier A2. Care is taken to balance each other fully. Transformer T1 is wound with a balanced primary winding so that the capacity and the inductance is very closely equal for each half of the secondary. In addition the secondary windings may be wound in a bifilar form.

Figure 5:
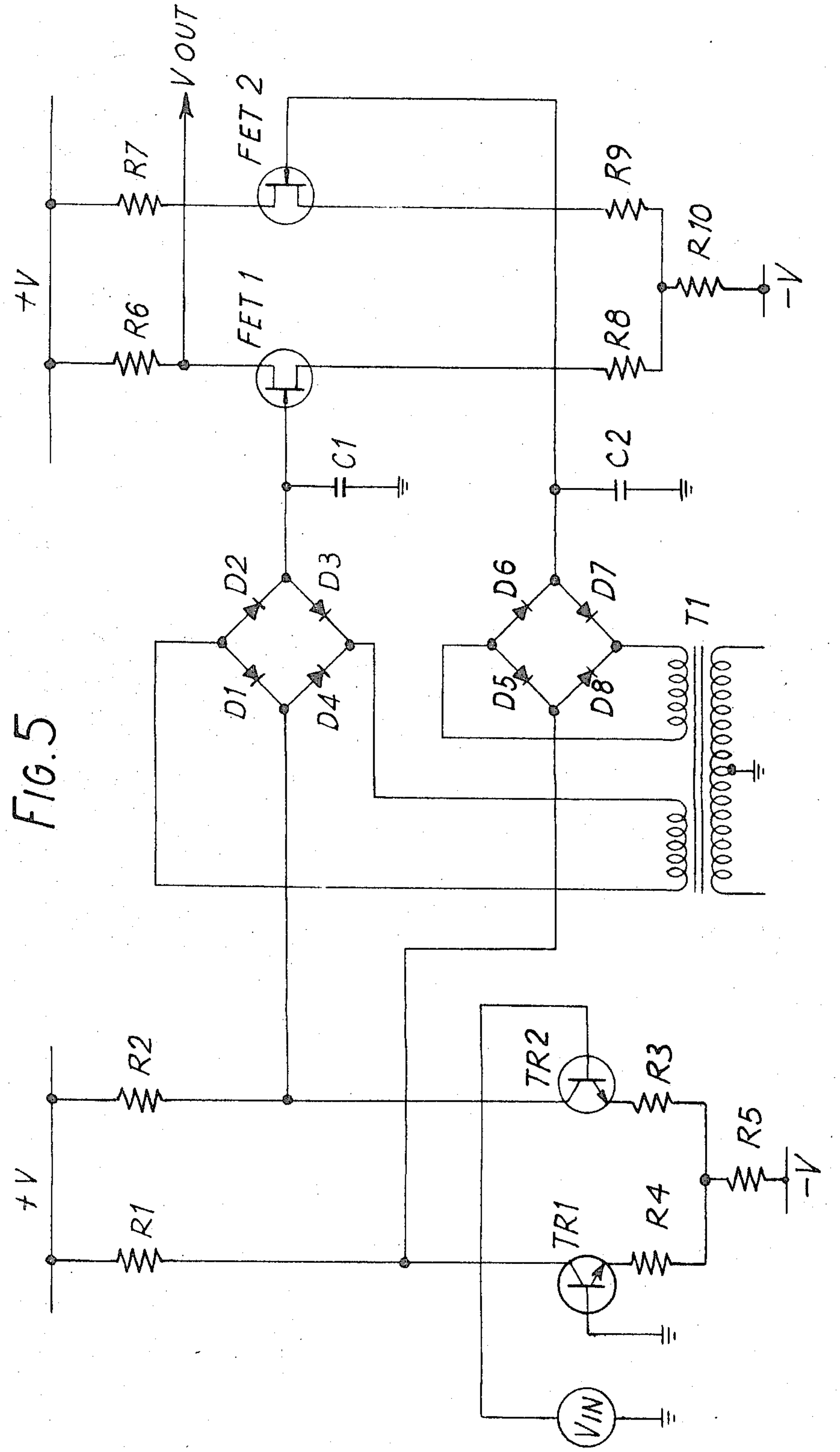
FIG. 5 shows possible forms of input and output buffer amplifier connected to the sampling system of FIG. 4.

A practical realization of FIG. 4 is shown in FIG. 5. Differential amplifier A1 is implemented by transistors TR1 and TR2 in a long tailed pair configuration. The outputs to the two lines taken from the collector electrode of each transistor are applied to the balanced bridge sampling circuits. The bridges are driven from transformer T1 using balanced driving sources. Capacitors C1 and C2 have equal value and are the memory capacitors for each half of the sampler. The differential output amplifier A2 is implemented by field effect transistors FET1 and FET2 in the long tailed pair configuration. The output may be taken either by reference to ground as a single ended signal or by reference to the output appearing across R7 and R6 in a differential manner. The principal improvement of this form of amplifier for combining the signals is the reduction in noise caused by the sampling pulse.

A further advantage of the circuit is the reduction in the 'droop' of the stored voltage on the capacitors which occurs after taking each sample if too much current is drawn by the amplifier. With field effect transistors gate current is extremely small and the problem is alleviated. The charge impressed on capacitor C1 in FIG. 1 slowly leaks away into the output buffer amplifier and into the leakage of the diodes. In addition a certain amount of charge is leaked by the dielectric of the capacitor itself. The charge leakage results in the voltage at the output slowly changing between taking one sample and the next sample instead of remaining absolutely constant. The larger the memory capacitor in relationship to the leakage current the lower the droop in stored voltage, however, a large memory capacitor reduces the effective bandwidth of the system as it takes longer to charge the memory capacitor during each sampling pulse. The circuit described in FIG. 4 and its implementation in FIG. 5 allows a reduction in the size of C1 and C2 without introducing a larger droop. The principle reason for this advantage is that the leakage through capacitor C1 and C2 into the diode leakage and into the output buffer amplifier A2 is of a common mode nature. That is, the droop is in the same direction and at the same rate. Care is taken to design the circuit so that the droop on both inputs to amplifier A2 is closely matched between samples and the common mode rejection of the amplifier ensures that no change in voltage occurs at the output. An advantage of this system is that the bandwidth of the sampling circuit may be increased without consequent increase in the droop which appears at the output of the circuit. The description of the improvements to the high speed sample and hold circuit have been described making the assumption that a bridge diode arrangement is used to switch the input voltage onto a memory capacitor from an electrical sampling pulse. There is no reason why other forms of switching should not be used and the circuit principle is equally valid using an FET switch or an MOS switch or other equivalent high speed electronic circuits.

I claim:

1. A signal sampling circuit comprising
   a. a first line for receiving an analogue signal,
   b. a second line for receiving an inverted replica of the analogue signal,
   c. switch means in each line for simultaneous sampling of the analogue signal and the inverted replica signal,
   d. storage means in said first and second lines, and
   e. means for triggering said switch means to permit passage of the analogue and the inverted replica signals during the sampling period to charge said storage means, whereby on receipt of stored signals by a differential buffer amplifier substantially interference-free signals are produced.

2. A signal sampling circuit according to claim 1, including means for receiving an analogue input signal and for producing on said first and second lines respectively an analogue output signal and an inverted replica of said analogue output signal.

3. A signal sampling circuit according to claim 2, where said means for receiving the analogue input signal comprises a differential buffer amplifier having non-inverting and an inverting outputs.

4. A signal sampling circuit according to claim 3, wherein said differential buffer amplifier comprises a pair of transistors connected in a long tailed pair configuration.

5. A signal sampling circuit according to claim 1, wherein the switch means each comprise a diode bridge circuit connected in the respective line by opposite nodal pairs, the bridge circuit being switched by means of triggering signals applied between the other opposite nodal pairs of the bridge circuit.

6. A signal sampling circuit according to claim 5 including a transformer for producing said triggering signals for each bridge circuit, said transformer having a primary winding for connection to a triggering signal source and secondary windings connected respectively to said bridge circuits.

7. A signal sampling circuit according to claim 1, wherein said storage means comprise capacitors of equal value connected respectively to the outputs of the switches.

8. A signal sampling circuit according to claim 1, including means for rejecting common mode interference and accepting differential signals.

9. A signal sampling circuit according to claim 8, wherein said means for rejecting common mode interference and accepting differential signals comprises a differential buffer amplifier.

10. A signal sampling circuit according to claim 9, wherein said differential buffer amplifier comprises field effect transistors in long tailed pair configuration.

* * * * *